United States Patent
Aguilar Ruelas et al.

(10) Patent No.: US 11,097,663 B2
(45) Date of Patent: Aug. 24, 2021

(54) SMARTPACKING TRAY

(71) Applicant: Ford Global Technologies, LLC, Dearborn, MI (US)

(72) Inventors: Eduardo Arturo Aguilar Ruelas, Mexico City (MX); Jose Luis Gallardo, Atizapan de Zaragoza (MX)

(73) Assignee: Ford Global Technologies, LLC, Dearborn, MI (US)

( * ) Notice: Subject to any disclaimer, the term of this patent is extended or adjusted under 35 U.S.C. 154(b) by 219 days.

(21) Appl. No.: 16/135,033

(22) Filed: Sep. 19, 2018

(65) Prior Publication Data

US 2020/0086798 A1   Mar. 19, 2020

(51) Int. Cl.
*B60R 5/04* (2006.01)
*B60R 5/00* (2006.01)
*B60R 13/01* (2006.01)

(52) U.S. Cl.
CPC .............. *B60R 5/048* (2013.01); *B60R 5/006* (2013.01); *B60R 13/011* (2013.01); *B60R 2013/016* (2013.01); *B60R 2013/018* (2013.01)

(58) Field of Classification Search
CPC .......... B60R 13/01; B60R 7/02; B60R 11/00; B60R 11/06; B60R 5/04; B60R 5/045
USPC ............... 296/39.1, 37.16, 24.44, 37.1, 37.5; 224/42.34, 542, 925, 42.33
See application file for complete search history.

(56) References Cited

U.S. PATENT DOCUMENTS

| 3,393,936 | A | | 7/1968 | Hall | |
| 3,896,742 | A | | 7/1975 | Ferraro | |
| 4,226,348 | A | | 10/1980 | Dottor et al. | |
| 4,718,584 | A | * | 1/1988 | Schoeny | B60R 7/02 217/12 R |
| 5,054,668 | A | * | 10/1991 | Ricchiuti | B60R 7/02 224/42.33 |
| 5,419,602 | A | * | 5/1995 | VanHoose | B60R 13/01 296/37.16 |
| 5,484,091 | A | | 1/1996 | Malinowski et al. | |
| 5,570,921 | A | | 11/1996 | Brooker | |
| 6,682,118 | B2 | | 1/2004 | Ryan | |
| 7,201,421 | B2 | * | 4/2007 | Reynolds | B60R 7/02 224/400 |
| 7,762,601 | B2 | * | 7/2010 | Shea | B60R 11/06 296/37.16 |
| 2009/0066103 | A1 | * | 3/2009 | Koarai | B60N 2/773 296/24.34 |
| 2015/0336514 | A1 | * | 11/2015 | Brown, Jr. | B60P 3/36 108/33 |

* cited by examiner

*Primary Examiner* — D Glenn Dayoan
*Assistant Examiner* — Sunsurraye Westbrook
(74) *Attorney, Agent, or Firm* — David Coppiellie; Price Heneveld LLP

(57) ABSTRACT

A vehicular cargo assembly includes first and second panels disposed in a vehicle cabin. A plurality of grooves is provided for slidably coupling the first panel to the second panel. The first panel is movable between a first position, wherein the first panel is superjacent to the second panel, and a second position, wherein the first panel is adjacent to the second panel.

19 Claims, 5 Drawing Sheets

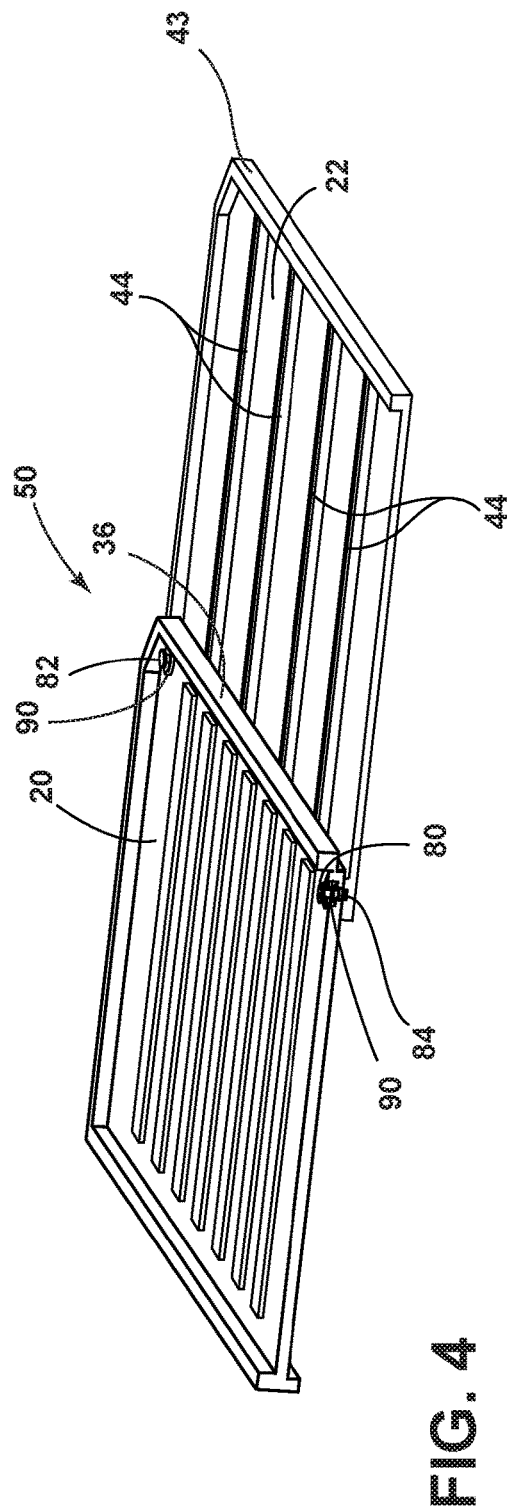
FIG. 4
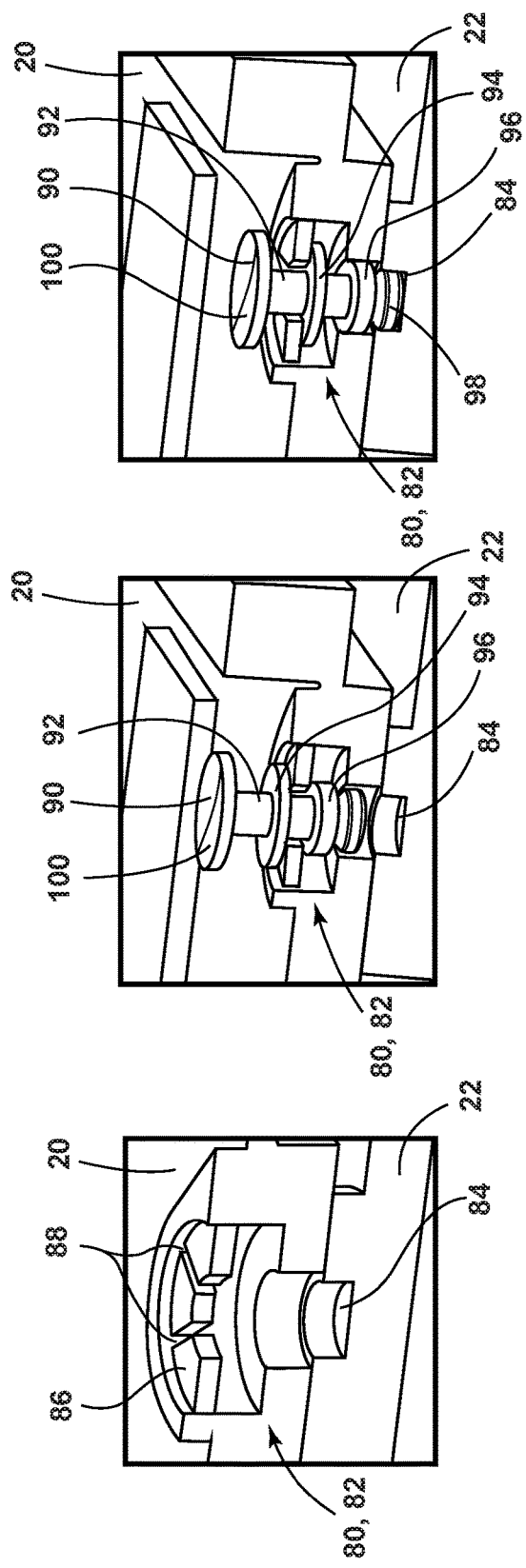
FIG. 5A
FIG. 5B
FIG. 5C

SMARTPACKING TRAY

FIELD OF THE INVENTION

The present invention generally relates to a cargo assembly for a vehicle, and more particularly, a cargo assembly including adjustable panels.

BACKGROUND OF THE INVENTION

Some vehicles include extended trunk space in order to increase cargo carrying capacity of the vehicle. It would be beneficial to adapt an extended trunk compartment with an assembly configured to reduce loading effort. The present disclosure is intended to satisfy this need.

SUMMARY OF THE INVENTION

According to one aspect of the present invention, a vehicular cargo assembly includes first and second panels disposed in a vehicle cabin. A plurality of grooves is provided for slidably coupling the first panel to the second panel. The first panel is movable between a first position, wherein the first panel is superjacent to the second panel, and a second position, wherein the first panel is adjacent to the second panel.

Embodiments of the first aspect of the invention can include any one or a combination of the following features:
  the second panel is secured to a cabin floor by at least one attachment tab;
  the first panel is retained in the second position by at least one pushpin;
  the at least one pushpin comprises at a snap-fitting element;
  the plurality of grooves are disposed upon an underside of the first panel;
  a top face of the second panel includes a plurality of ridges configured to slidably engage the grooves; and
  the first panel includes a peripheral rim for preventing the movement of cargo.

According to a second aspect of the present invention, a method of operating a vehicular cargo assembly includes placing cargo onto a first panel. The first panel slides from a superjacent position to an adjacent position with respect to a second panel. The first panel locks into the adjacent position using at least one pushpin.

Embodiments of the second aspect of the invention can include any one or a combination of the following features:
  placing cargo on the second panel;
  securing the second panel to a cabin floor using at least one attachment point;
  restoring the first panel to the superjacent position; and
  engaging at least one snap-fitting element to secure the first panel in the adjacent position.

According to a third aspect of the present invention, a vehicular cargo assembly includes first and second panels disposed in a vehicle cabin. The first panel is slidably adjustable between a first position superjacent to the second panel and a second position adjacent to the panel.

Embodiments of the third aspect of the invention can include any one or a combination of the following features:
  the second panel is secured to a cabin floor by at least one attachment tab;
  the first panel is retained in the second position by at least one pushpin;
  at least one pushpin comprises at least one snap-fitting element;
  the first panel and the second panel are removably coupled;
  the first panel includes at least one protuberance configured to prevent the movement of cargo;
  a plurality of grooves are disposed upon a bottom surface of the first panel; and
  a top face of the second panel includes a plurality of ridges configured to slidably engage the plurality of grooves.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 4 a cross-sectional view of the vehicular cargo assembly with the second panel in the extended position;

FIG. 5A illustrates a panel aperture configured to accept a pushpin for retaining the position of the first panel;

FIG. 5B illustrates the panel aperture including a pushpin in an uninstalled position; and FIG. 5C illustrates the pushpin in an installed position within the panel aperture.

DETAILED DESCRIPTION OF THE PREFERRED EMBODIMENTS

Figure 1A:
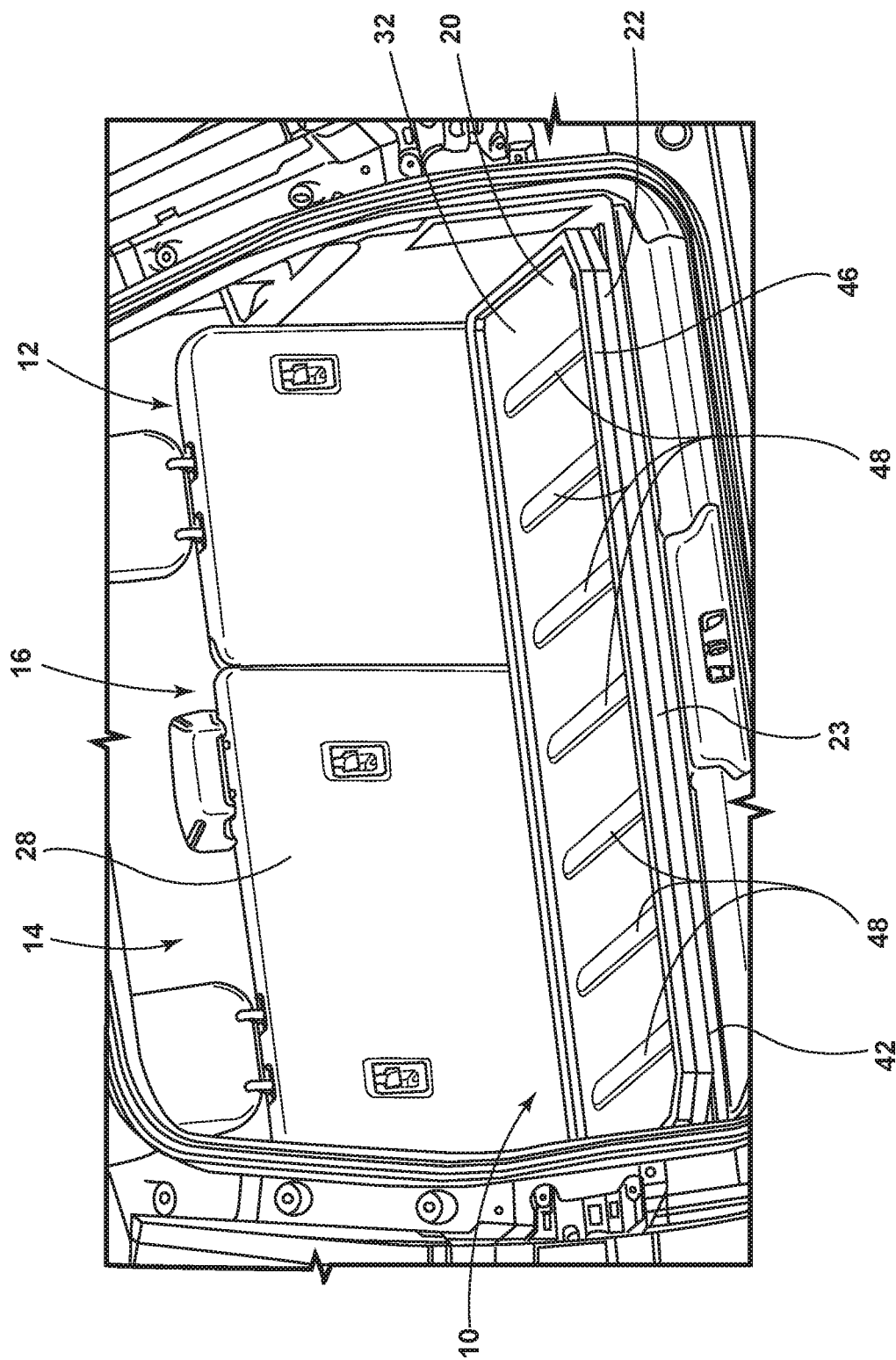
FIG. 1A is a perspective view of a vehicular cargo assembly including a first panel superjacent to a second panel.

For purposes of description herein, the terms "upper," "lower," "right," "left," "rear," "front," "vertical," "horizontal," "interior," "exterior," and derivatives thereof shall relate to the disclosure as oriented in FIG. 1A. However, it is to be understood that the disclosure may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1B:
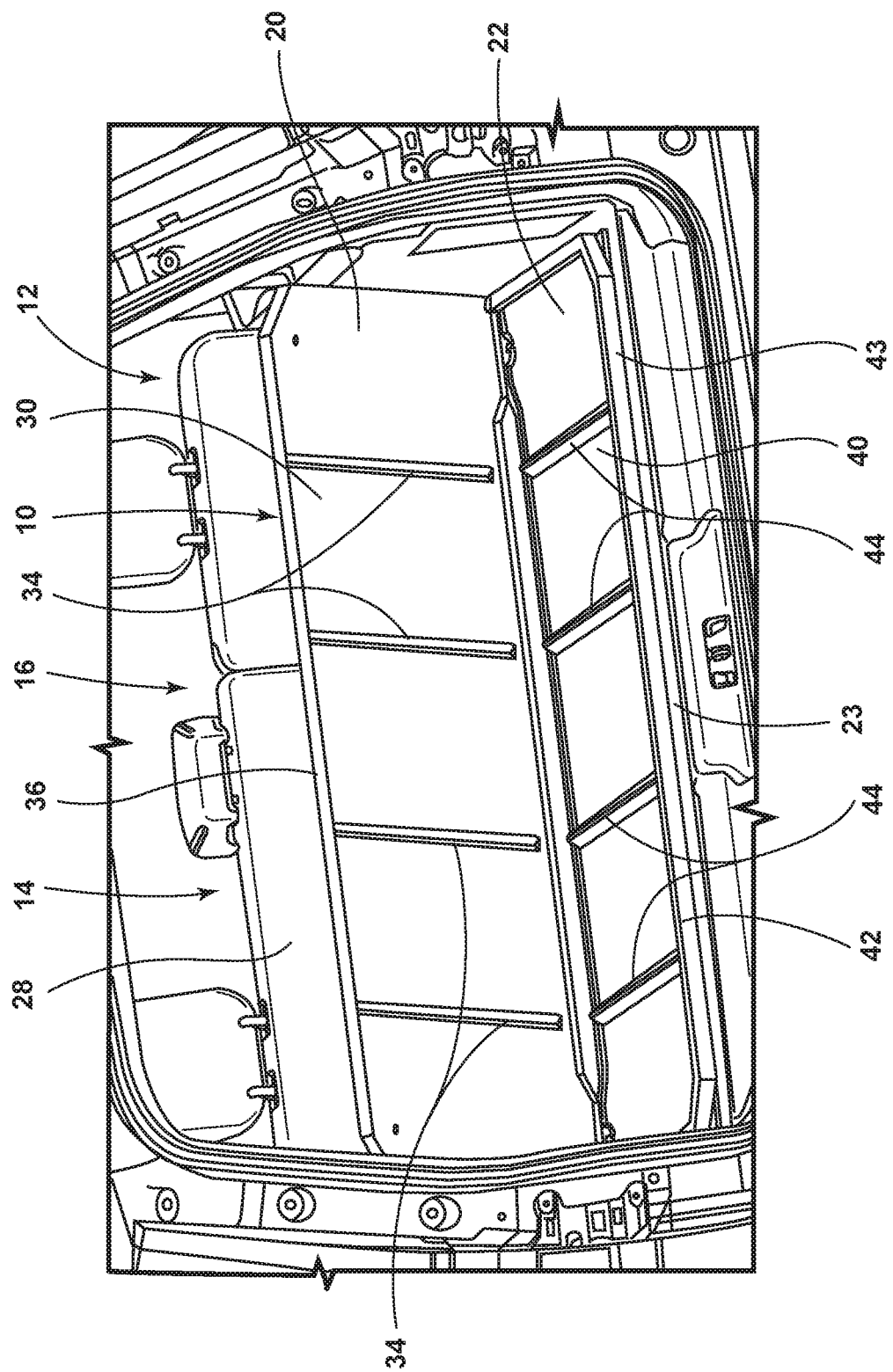
FIG. 1B is an exploded view of the vehicular cargo assembly in order to illustrate a plurality of grooves position on a bottom surface of the first panel.
Figure 1C:
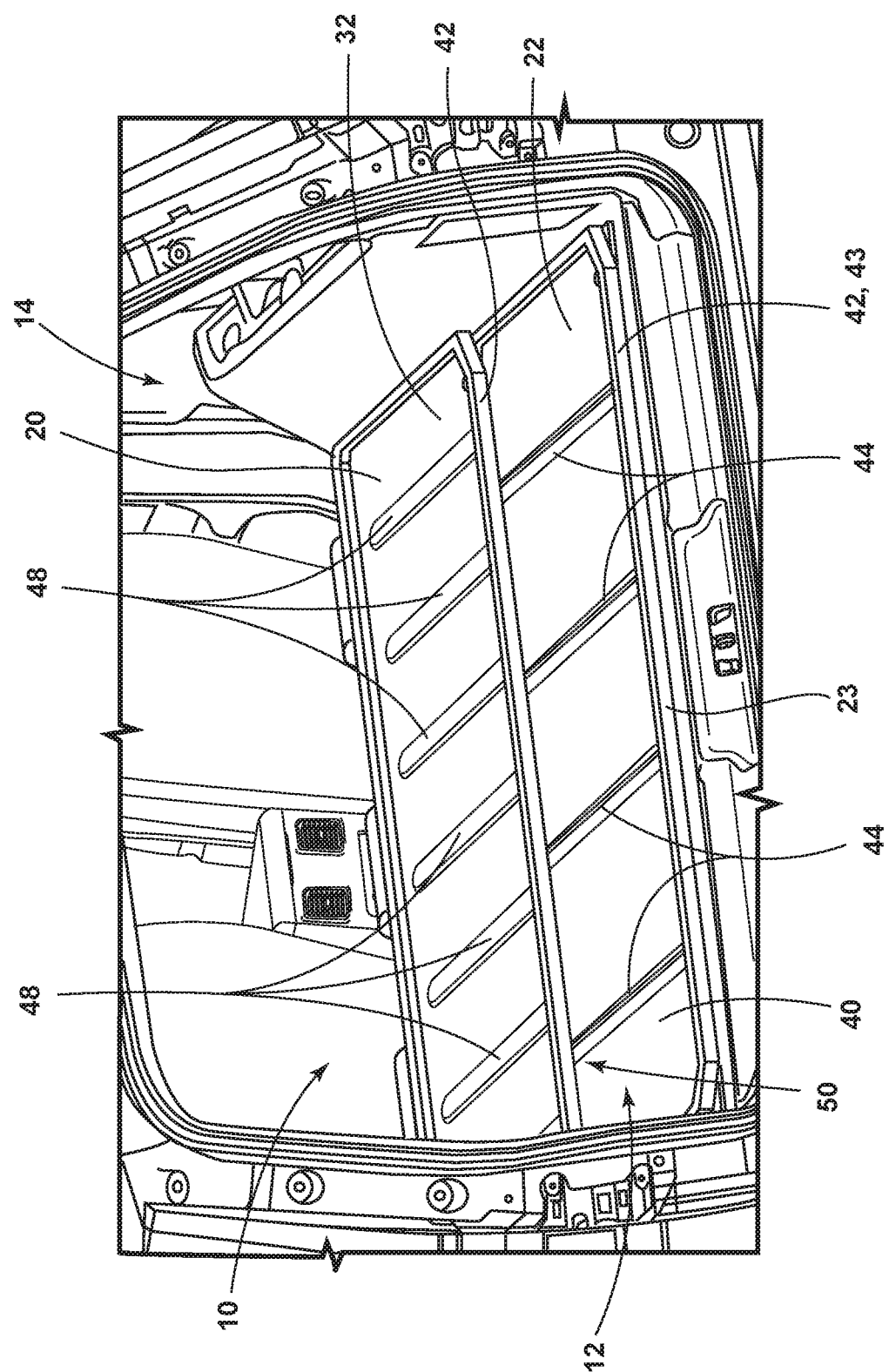
FIG. 1C is a perspective view of the vehicular cargo with the first panel in an extended position adjacent to the second panel.

The following disclosure describes a cargo assembly for a vehicle, and in particular, a cargo assembly including at least a first panel and a second panel adapted to facilitate the loading and unloading of cargo from a vehicle trunk compartment. The first panel is generally planar and may be slidable between a flat position and an extended position adjacent to the second panel. The second panel is generally planar and secured to a cabin floor via a mounting assembly including at least one attachment tab. While the first panel is in the flat position, the first panel is superjacent to the second panel and cargo may be loaded and unloaded upon a top surface of the first panel. A plurality of ridges and a plurality of grooves generally define a slide assembly that may couple the first panel to the second panel (FIG. 1B). The plurality of grooves are configured to accept the corresponding plurality of ridges in order to enable the first panel to be adjusted between the flat position to the extended position with respect to the second panel. The extended position relates to the first panel being adjusted vehicle forward within a vehicle cabin (FIG. 1C). In the extended position, the first panel is adjacent to the second panel. In this way the cargo assembly enables an individual to load cargo further into the trunk compartment without having to extend their body into the vehicle cabin. As such, the cargo assembly reduces the potential for strain and injury while loading and unloading cargo within the vehicle.

Figure 2:
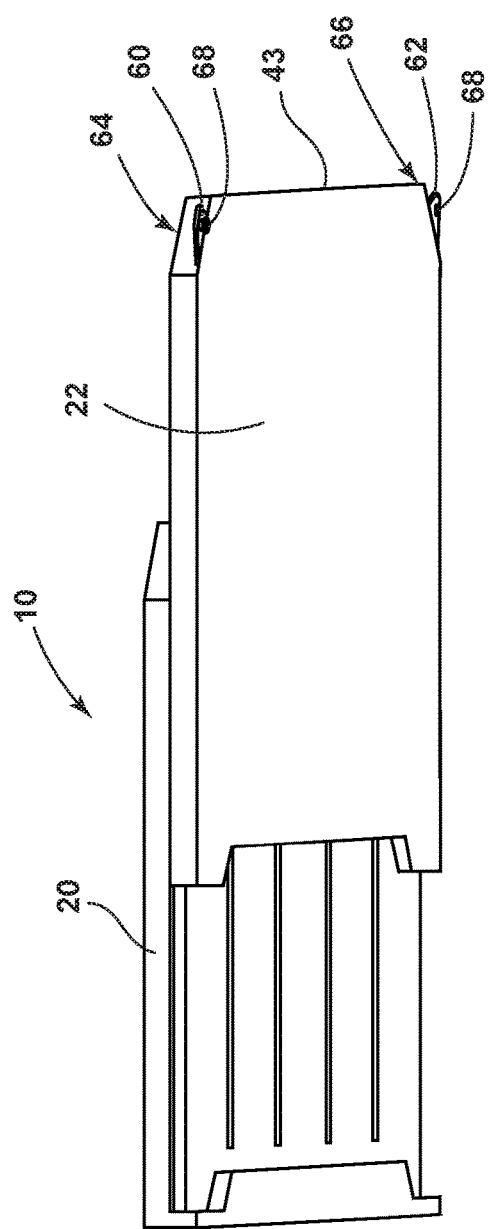
FIG. 2 is a perspective view of an underside of the vehicular cargo assembly detached from a cabin floor.

Referring to FIGS. 1A-2, a vehicular cargo assembly 10 is shown within trunk compartment 12 of a vehicle cabin 14. The trunk compartment 12 is generally adapted for the storing of cargo items within the vehicle cabin 14. The vehicle may be any vehicle having an open cabin with extendable trunk space for storing additional cargo items. However, the vehicle may additionally be any vehicle having a traditional trunk space for storing cargo items. The vehicle may include a rear seating assembly 16 positioned vehicle forward relative to the trunk compartment 12. The rear seating assembly 16 may be adjustable between an upright position (FIGS. 1A and 1B) and a stowed position (FIG. 1C). The vehicle may include a trunk door (not shown) configured to enable access to the trunk compartment 12 while in an opened position.

With continued reference to FIGS. 1A-2, the cargo assembly 10 includes a first panel 20 and a second panel 22 disposed within the trunk compartment 12 of the vehicle cabin 14. Each of the first and second panels 20, 22 may be generally planar in configuration, and may be composed of a scratch or damage resistant material. For example, the first and second panels 20, 22 may be composed of acrylonitrile butadiene styrene (ABS), polycarbonate or other damage resistant thermoplastic materials. As such, each of the first and second panels 20, 22 may be composed of other damage-resistant materials capable of supporting various cargo item As shown in FIG. 1B, a bottom surface 30 of the first panel 20 may include a plurality of grooves 34 that extend a width of the first panel 20. FIG. 1B depicts an exploded view of the vehicular cargo assembly 10 for the purpose of illustrating the plurality of grooves 34 of the first panel 20 and a plurality of ridges 44 of the second panel 22. The plurality of grooves 34 may extend from a top peripheral edge 36 towards the second panel 22 or a cabin floor 23. A periphery of a top face 40 of the second panel 22 may be defined by a first rim 42 that extends around the outside edge of the second panel 22. The top face 40 may include a plurality of ridges 44 that extend vehicle forward from a rear peripheral edge 43 of the second panel 22 towards the first panel 20 and the rear seating assembly 16. The plurality of ridges 44 may be aligned with and the plurality of grooves 34 disposed upon the bottom surface 30 of the first panel 20. In an alternative aspect of the invention, the plurality of grooves 34 may be disposed upon the top face 40 of the second panel 22, and the plurality of ridges 44 may be formed on the bottom surface 30 of the first panel 20.

As shown in FIG. 1A, the first panel 20 is superjacent to the second panel 22 while in the flat position. As will be discussed below, the plurality of grooves 34 are configured to accept the plurality of ridges 44, such that the first panel 20 is slidably mounted to the second panel 22. A top surface 32 of the first panel 20 may include a second rim 46 defining the periphery of the first panel 20. The position of the second rim 46 may correspond with the position of the first rim 42 of the second panel 22 when the first panel 20 is in the flat position (FIG. 1A). The second rim 46 may be configured to prevent the displacement of cargo from the top surface 32 of the first panel 20 when the vehicle is in motion or when the second rim 46 is adjusted to the extended position. A plurality of protuberances 48 may be disposed on the top surface 32 of the first panel 20 and, in addition to the second rim 46, may be adapted to reduce movement of cargo within the trunk compartment 12.

With continued reference to FIGS. 1A-C, each of the plurality of grooves 34 may be configured to accept one of the corresponding plurality of ridges 44 in order to enable sliding of the first panel from the flat to extended position. Each of the plurality of grooves 34 and each of the plurality of ridges 44 may be adapted to form a slide assembly 50, wherein the plurality of ridges 44 are configured to slidably engage the plurality of grooves 34 (FIG. 1C). The interaction between the plurality of grooves 34 and the plurality of ridges 44 facilitates sliding of the first panel 20 from the flat position to the extended position with respect to the second panel 22 (FIG. 1C). While in the extended position, the first panel 20 is positioned adjacent to the second panel 22 in the vehicle forward direction. In some embodiments of the invention, the cargo assembly 10 may be adjustable only between the flat and extended positions. In this embodiment, the first panel 20 remains coupled to the second panel 22 via the slide assembly 50, and is movable between the flat and extended positions. The plurality of grooves 34 and the plurality of ridges 44 of the slide assembly 50 may be composed of a plastic or metal material configured to reduce friction between the first and second panels 20, 22. For instance, each of the plurality of ridges 44 may form a plurality of steel or aluminum slide rails configured to slidably couple the first panel 20 to the second panel 22. Alternatively the slide assembly 50 may include a plurality of wheels mounted to the bottom surface 30 of the first panel 20. The wheels may be configured to slide within the plurality of grooves 34 disposed upon the face of the second panel 22 in order to enable sliding of the first panel 20 between the flat and extended positions.

Figure 3:
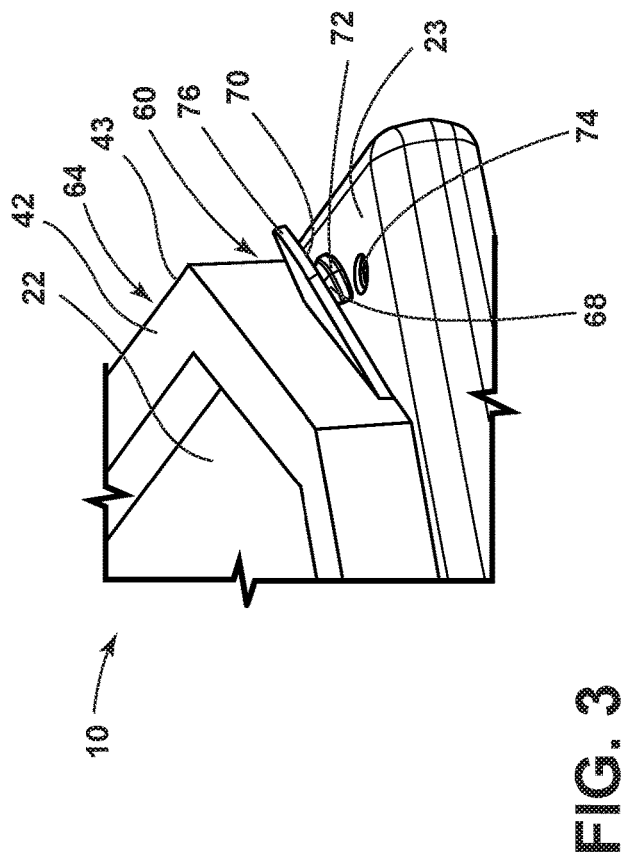
FIG. 3 illustrates an attachment tab of the vehicular cargo assembly.

Referring to FIGS. 2-3, the cargo assembly 10 includes at least a first attachment tab 60 and a second attachment tab 62 configured to mount the cargo assembly 10 to a cabin floor 23, or alternatively, a trunk bed. The first and second attachment tabs 60, 62 extend from the second panel 22 at right and left corners 64, 66 of the rear peripheral edge 43. Each of the first and second attachment tabs 60, 62 may be adapted as a flat extension or foot of the second panel 22, and may be integral with the second panel 22 or attached via an attachment assembly. Each of the first and second attachment tabs 60, 62 may be comprised of an impact resistant plastic or metal. A rounded snap-fitting pin 68 may extend from a bottom surface 70 of each of the first and second attachment tabs 60, 62. The snap-fitting pin 68 may include a collar 72 that surrounds at least a portion of the snap-fitting pin 68. The collar 72 may be configured to snap-fit within an aperture 74 located on the cabin floor 23. Once the collar 72 has passed through a surface of the cabin floor 23, the snap-fitting pin 68 may be retained within the aperture 74. The first and second attachment tabs 60, 62 may include a toe 76 that forms the end of the first and second attachment tabs 60, 62, which may enable a user to release the snap-fitting pin 68 from the aperture 74 by pulling upwards on the toe 76. Once the first and second attachment tabs 60, 62 have been disengaged from the aperture 74, the cargo assembly 10 may be removed from the vehicle trunk compartment 12. The removal of the cargo assembly 10 from the vehicle may facilitate cleaning of the cargo assembly 10 while outside of the vehicle.

Referring to FIGS. 4-5C, the first panel 20 includes first and second panel apertures 80, 82 positioned proximate the top peripheral edge 36 of the first panel 20. Each of the first and second panel apertures 80, 82 is configured to be aligned with a notch 84 of the second panel 22. The first and second panel apertures 80, 82 include at least one resilient flange 86 that extends around the interior of the first and second panel apertures 80, 82. The first resilient flange 86 may include a plurality of hollowed out portions 88 configured to enable the resilient flange 86 to flex in response to a pushpin 90 being received by the first and second panel apertures 80, 82. The pushpin 90 may include a shaft 92 with first and second lips 94, 96 surrounding the shaft 92. The first lip 94 may have a larger circumference than the second lip 96. A tip 98 of the pushpin 90 may include a circumference significantly wider than the shaft 92 in order to prevent the movement of the pushpin 90 once the tip 98 has been secured to the notch 84. The first and second lips 94, 96 are configured to provide resistance when the pushpin 90 is accepted by the first and second panel apertures 80, 82 as the first lip 94 engages the first resilient flange 86.

The configuration of the first resilient flange 86 and the first lip 94 enables the pushpin 90 to act as a snap-fitting element that retains the pushpin 90 within the first and second panel apertures 80, 82. The first resilient flange 86 is configured to flex when a sufficient downward force is applied to the pushpin 90. As such, the pushpin 90 may be movable between an uninstalled position wherein the tip 98 of the pushpin 90 is not in contact with the notch 84 of the second panel 22 (FIG. 5B), and an installed position wherein the first lip 94 has passed through the first resilient flange 86 and the tip 98 of the pushpin 90 is engaged with the notch 84 of the second panel 22 (FIG. 5C). While the pushpin 90 is in the installed position, the pushpin 90 retains the first panel 20 in the extended position, as the engagement of the pushpin 90 with the notch 84 prevents the first panel 20 from sliding towards the second panel 22. A top portion 100 remains exposed from the first and second panel apertures 80, 82 in order to enable a user to remove the pushpin 90 from the first and second panel apertures 80, 82. Once the pushpin 90 is removed from the installed position, the first panel 20 is free to slide back to the flat position, superjacent to the second panel 22.

In installation, the cargo assembly 10 may be installed within a vehicle by loading the first and second panels 20, 22 on to the cabin floor 23 or trunk bed and aligning the first and second attachment tabs 60, 62 with the apertures 74. The snap-fitting pins 68 are then inserted into the apertures 74 and the cargo assembly 10 is retained within the trunk compartment 12. The first panel 20 may be position superjacent to the second panel 22 while the snap-fitting pins 68 are inserted into the aperture 74. When situations require loading of a greater quantity of cargo, the cargo assembly 10 may be adjusted in order to enlarge the cargo carrying capacity of a vehicle. First, the rear seating assembly 16 may then be adjusted to a stowed position to accommodate the first panel 20. Once the first panel 20 has been loaded with cargo, an individual may apply a force in the vehicle forward direction in order to slide the first panel 20 from the flat position superjacent to the second panel 22, to the extended position adjacent to the second panel 22. The slide assembly 50 that enables adjustment of the first panel 20 may include the plurality of grooves 34 and the plurality of ridges 44. The slide assembly 50 ensures that the first panel 20 is easily adjusted to the extended position with a minimal amount of force applied in the vehicle forward direction. The pushpins 90 may then be inserted into the first and second panel apertures 80, 82 of the first panel 20, where a downward force allows the pushpin 90 to move into the installed position. Once each pushpin 90 has been fully installed, the first panel 20 may be retained in the extended position until the pushpin 90 has been removed. While the first panel 20 is retained in the extended or adjacent position, cargo may be loaded on to the second panel 22, thus doubling the cargo carrying capacity of the trunk compartment 12.

As such, a cargo assembly for a vehicle includes first and second panels disposed within a vehicle cabin. The first and second panels may be coupled to the cabin floor via attachment tabs having a snap-fitting pin configured to be inserted into an aperture located on the cabin floor or trunk bed. The first panel may be adjustable between a flat position and an extended or adjacent position. When increased cargo space is required, the top surface of the first panel may be loaded with cargo. Once cargo has been loaded on to the first panel, the rear seating assembly may be adjusted to the stowed position in order to accommodate the first panel. The first panel may then be adjusted in a vehicle forward direction in order to expose the face of the second panel, and thus allowing cargo to be loaded on to the second panel. Pushpins may then be adapted for securing the first panel in the extended position. Each pushpin is configured to be inserted into a panel aperture, wherein the pushpin engages a notch of the second panel, preventing sliding of the first panel from the adjacent position. Therefore, cargo may be stored further into the vehicle trunk compartment without requiring an individual to extend their body further into the vehicle cabin. Thus, the risk of injury or strain on the passenger is reduced while additionally increasing the cargo carrying capacity of the vehicle.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

For purposes of this disclosure, the term "coupled" (in all of its forms: couple, coupling, coupled, etc.) generally means the joining of two components directly or indirectly to one another. Such joining may be stationary in nature or movable in nature. Such joining may be achieved with the two components and any additional intermediate members being integrally formed as a single unitary body with one another or with the two components. Such joining may be permanent in nature, or may be removable or releasable in nature, unless otherwise stated.

It is also important to note that the construction and arrangement of the components of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, components shown as integrally formed may be constructed of multiple parts, or elements shown as multiple parts may be integrally formed, the length or width of the structures may be varied, and the nature or number of adjustment positions provided between the components may be varied. It should be noted that the components may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicular cargo assembly, comprising:
   first and second panels disposed in a vehicle cabin;
   a plurality of grooves for slidably coupling the first panel to the second panel; and
   wherein the first panel is movable between a first position, wherein the first panel is superjacent to the second panel, and a second position, wherein the first panel is adjacent to the second panel, wherein the second panel is secured to a cabin floor by at least one attachment tab.

2. The vehicular cargo assembly of claim 1, wherein the first panel is retained in the second position by at least one pushpin.

3. The vehicular cargo assembly of claim 2, wherein the at least one pushpin comprises at a snap-fitting element.

4. The vehicular cargo assembly of claim 1, wherein the plurality of grooves are disposed upon an underside of the first panel.

5. The vehicular cargo assembly of claim 1, wherein a top face of the second panel includes a plurality of ridges configured to slidably engage the grooves.

6. The vehicular cargo assembly of claim 1, wherein the first panel includes a peripheral rim for preventing the movement of cargo.

7. A method of operating a vehicular cargo assembly in a cargo compartment adjacent to a seating assembly of a vehicle, the method comprising the steps of:
   slidably coupling a groove of a first panel to a ridge of a second panel;
   placing cargo onto the first panel;
   sliding the groove of the first panel along the ridge of the second panel from a superjacent position to an adjacent position with respect to a second panel, wherein the second panel extends over a portion of the seating assembly in the adjacent position; and
   locking the first panel into the adjacent position.

8. The method of claim 7, further comprising the step of:
   placing cargo on the second panel.

9. The method of claim 7, further comprising the step of:
   securing the second panel to a cabin floor using at least one attachment point.

10. The method of claim 8, further comprising the step of:
    restoring the first panel to the superjacent position along the ridge of the second panel.

11. The method of claim 7, further comprising the step of:
    engaging at least one snap-fitting element to secure the first panel in the adjacent position.

12. A vehicular cargo assembly, comprising:
    a first panel comprising at least one groove; and
    a second panel comprising at least one ridge having a complementary shape to the groove, wherein the at least one ridge engages the at least one groove forming a directional coupling of the first panel to the second panel, wherein the first panel is slidably adjustable along the directional coupling between a first position superjacent to the second panel and a second position adjacent to the panel.

13. The vehicular cargo assembly of claim 12, wherein the second panel is secured to a cabin floor by at least one attachment tab.

14. The vehicular cargo assembly of claim 7, wherein the first panel is retained in the second position by at least one pushpin.

15. The vehicular cargo assembly of claim 14, wherein the at least one pushpin comprises at least one snap-fitting element.

16. The vehicular cargo assembly of claim 12, wherein the first panel and the second panel are removably coupled.

17. The vehicular cargo assembly of claim 12, wherein the first panel includes at least one protuberance configured to prevent the movement of cargo.

18. The vehicular cargo assembly of claim 12, wherein the plurality of grooves are disposed upon a bottom surface of the first panel.

19. The vehicular cargo assembly of claim 18, wherein a top face of the second panel includes the plurality of ridges configured to slidably engage the plurality of grooves.

* * * * *